US008566359B1

(12) United States Patent
Donohoe et al.

(10) Patent No.: US 8,566,359 B1
(45) Date of Patent: Oct. 22, 2013

(54) UNFOLDING SPARSE DATA SETS

(75) Inventors: Brendan Donohoe, Berkeley, CA (US);
Murat N. Konar, Emeryville, CA (US);
Robert Jensen, Berkeley, CA (US);
Oren Jacob, Piedmont, CA (US)

(73) Assignee: Pixar, Emeryville, CA (US)

( * ) Notice: Subject to any disclaimer, the term of this patent is extended or adjusted under 35 U.S.C. 154(b) by 761 days.

(21) Appl. No.: 12/335,295

(22) Filed: Dec. 15, 2008

(51) Int. Cl.
*G06F 17/30* (2006.01)
*G06F 3/00* (2006.01)

(52) U.S. Cl.
USPC .......................................... 707/793; 715/723

(58) Field of Classification Search
USPC .......................................... 707/793; 715/723
See application file for complete search history.

(56) References Cited

U.S. PATENT DOCUMENTS

| 5,463,722 | A | * | 10/1995 | Venolia ........................ 345/662 |
| 5,680,619 | A | * | 10/1997 | Gudmundson et al. ....... 717/108 |
| 5,734,806 | A | * | 3/1998 | Narayanaswami ............ 345/422 |
| 5,737,559 | A | * | 4/1998 | Orton et al. ................... 715/807 |
| 5,808,601 | A | * | 9/1998 | Leah et al. .................... 715/856 |
| 5,880,742 | A | * | 3/1999 | Rao et al. ...................... 345/440 |
| 6,486,898 | B1 | * | 11/2002 | Martino et al. ................ 715/853 |
| 6,581,068 | B1 | * | 6/2003 | Bensoussan et al. ................ 1/1 |
| 7,016,894 | B2 | * | 3/2006 | Saeki ..................................... 1/1 |
| 7,836,086 | B2 | * | 11/2010 | Gregory et al. ............... 707/793 |
| 7,836,087 | B1 | * | 11/2010 | Gregory et al. ............... 707/793 |
| 7,873,685 | B2 | * | 1/2011 | Bugaj et al. ................... 707/831 |
| 7,889,923 | B1 | * | 2/2011 | Carr et al. ..................... 382/168 |
| 7,913,163 | B1 | * | 3/2011 | Zunger ......................... 715/243 |
| 2003/0156124 | A1 | * | 8/2003 | Good et al. ................... 345/620 |
| 2005/0060647 | A1 | * | 3/2005 | Doan et al. ................... 715/514 |
| 2005/0144567 | A1 | * | 6/2005 | Kurtenbach et al. .......... 715/810 |
| 2009/0021513 | A1 | * | 1/2009 | Joshi et al. .................... 345/419 |

* cited by examiner

*Primary Examiner* — Jorge A Casanova
(74) *Attorney, Agent, or Firm* — Patterson & Sheridan, LLP

(57) ABSTRACT

Empty elements or positions in an arrangement of data are hidden or revealed to present an overview of the relationships between empty and non-empty elements. Empty elements may be revealed at fractional increments of the interval between the two items. Additional empty elements may be revealed at smaller fractional increments of the intervals. Empty elements may be revealed at fixed increments within the interval between two items, with additional empty elements revealed at further multiples of this increment. Hierarchical arrangements of data may be unfolded or expanded to reveal additional empty or non-empty elements at further hierarchy levels. Similarly, nodes of arbitrary graphs that are empty, associated with a specified hierarchy level, and/or satisfy any other criteria may be automatically hidden and grouped with visible items. Hidden data may be revealed based on hierarchy level or a relative position with respect to one, two, or more visible items.

22 Claims, 7 Drawing Sheets

PARTIALLY-EXPANDED LAYER HIERARCHY
455

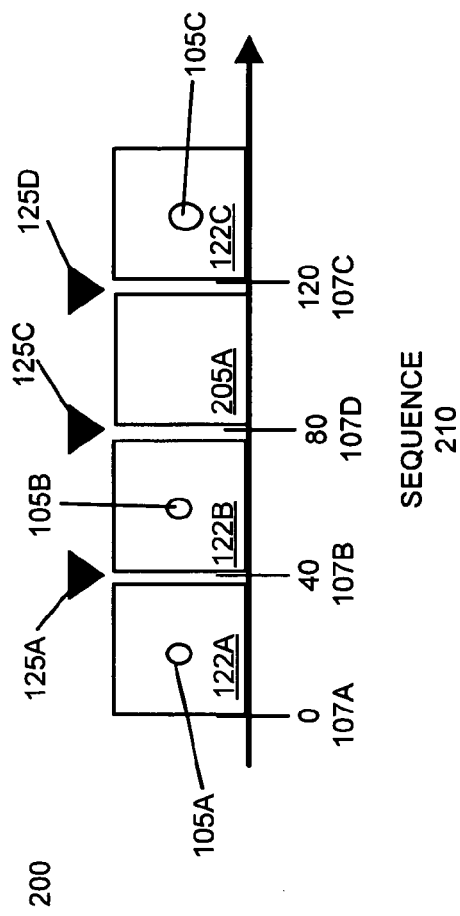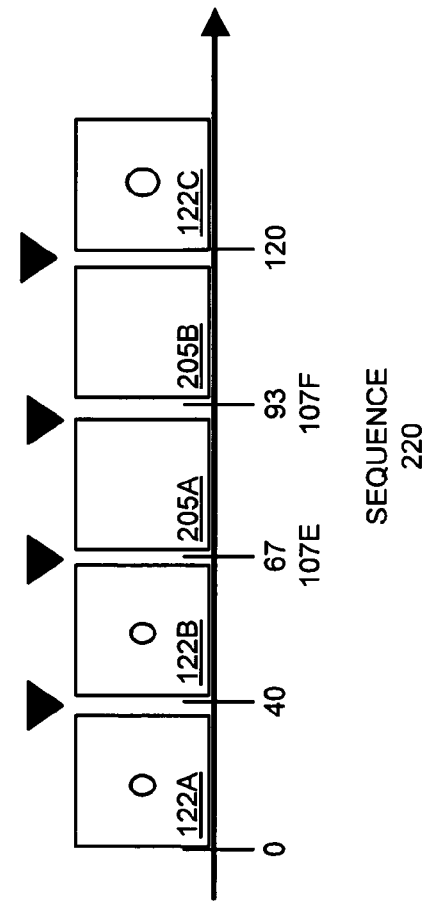

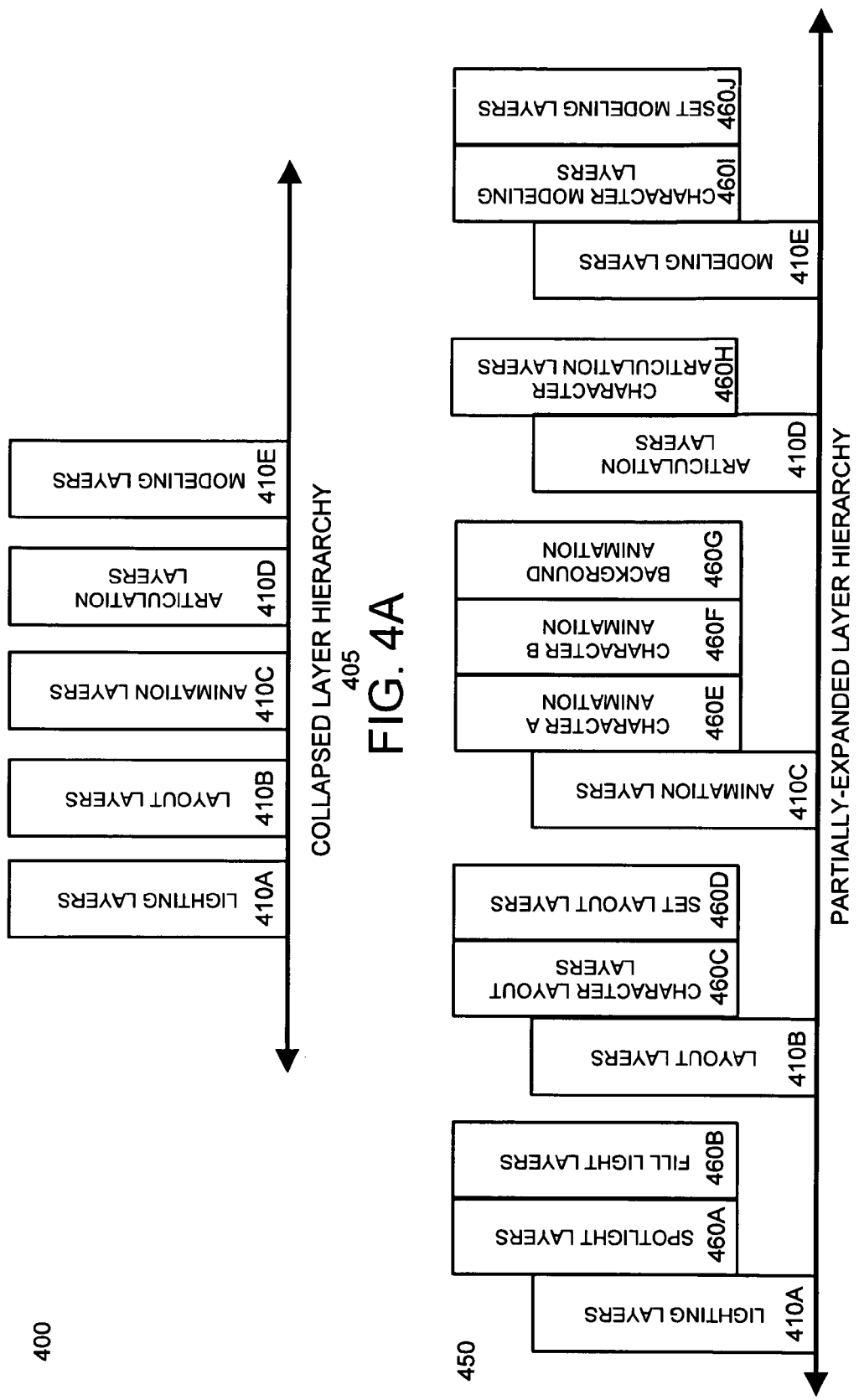

UNFOLDING SPARSE DATA SETS

BACKGROUND

The present invention relates to the field of user interfaces for computer programs and operating systems. Many computer programs and operating systems display items or data associated with a sequence or hierarchy. An arrangement of data or items is referred to as sparse if there is no data or items for at least a portion of the arrangement of data. For example, if a timeline includes data or items at time 0 and time 100, but no data or items at the intervening times, then this arrangement of data may be referred to as sparse.

Displaying and manipulating sparse arrangements of data is a challenge for user interfaces. Typically, user interfaces attempt to present users with a clear view of the overall arrangement of data and of the data values of each item. However, these two goals can contradict each other for sparse arrangements of data. Presenting a clear view of the overall arrangement of data often requires displaying large amounts of empty space, which represents the portions of the arrangement not associated with items or data. However, this leaves very little display area for presenting the data values. Furthermore, users may have to navigate through large areas of empty space to reach items or data.

SUMMARY

For arrangements of data, such as sequential and hierarchical arrangements of data, empty elements or positions in the arrangement have meaning. An embodiment of the invention folds or hides and unfolds or reveals empty elements or positions in an arrangement of data to present an overview of the relationships between empty and non-empty elements. For example, in response to a command to unfold or reveal empty elements or positions between two items in the arrangement of data, an embodiment of the invention uses an interval distribution function to select previously hidden items to be revealed. Interval distribution functions can select items to be displayed based on attributes of the items such as the positions, user defined attributes, hierarchy levels, or associations of items with selected or unselected components. For example, an interval distribution function may select empty elements located at fractional increments of the interval between the two items. Additional commands reveal additional empty elements at progressively smaller fractional increments of the interval.

In another example, an embodiment of the invention reveals empty elements located at fixed increments within the interval between the two items. Additional commands reveal additional empty elements at further multiples of this increment.

In an embodiment, hierarchical arrangements of data may be unfolded or expanded to reveal additional empty or non-empty elements at further hierarchy levels. In a further embodiment, hierarchical arrangements of data may be expanded in a breadth-first manner.

An embodiment of the invention can be similarly applied to any arbitrary graph of data or items. In these embodiments, nodes that are empty, associated with a specified hierarchy level, and/or satisfy any other criteria may be automatically hidden and grouped with visible data or items. In response to commands, gestures, or other inputs, hidden data may be revealed based on hierarchy level or a relative position with respect to one, two, or more visible items, such as based on fractional or fixed intervals of position in the arrangement of data.

BRIEF SUMMARY OF THE DRAWINGS

The invention will be described with reference to the drawings, in which:

FIGS. 2A-2C illustrate example unfoldings of sparse arrangements of data according to embodiments of the invention;

FIGS. 4A-4B illustrate example unfoldings of sparse hierarchical arrangements of data according to embodiments of the invention.

In the drawings, identical reference numbers indicate identical components.

DETAILED DESCRIPTION

Figure 1A:
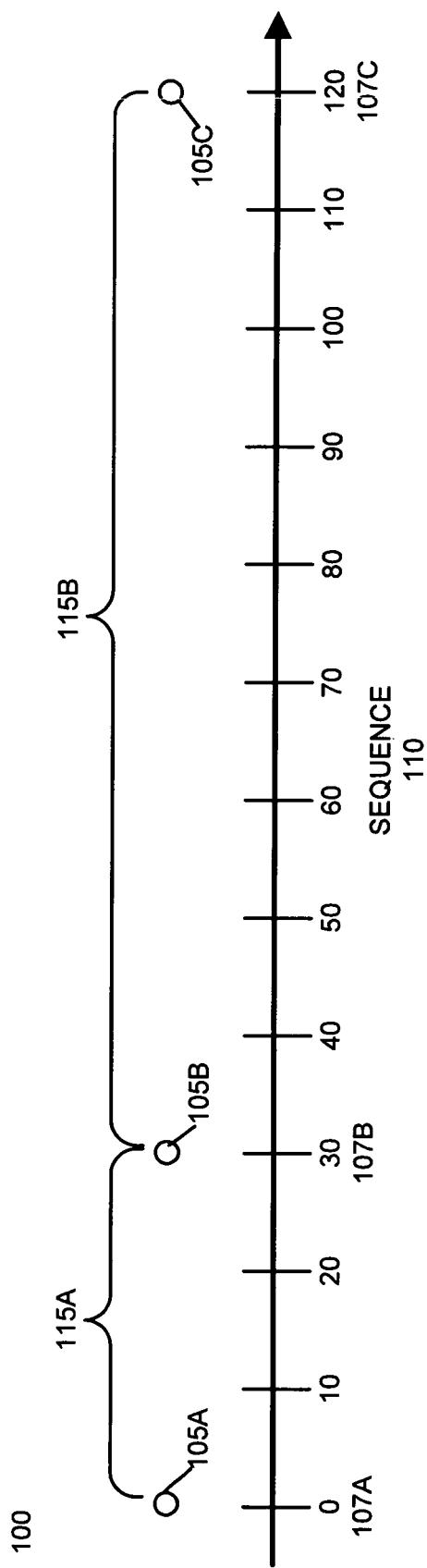
FIGS. 1A and 1B illustrate example display areas include sparse arrangements of data in fully expanded and folded presentations.
Figure 1B:
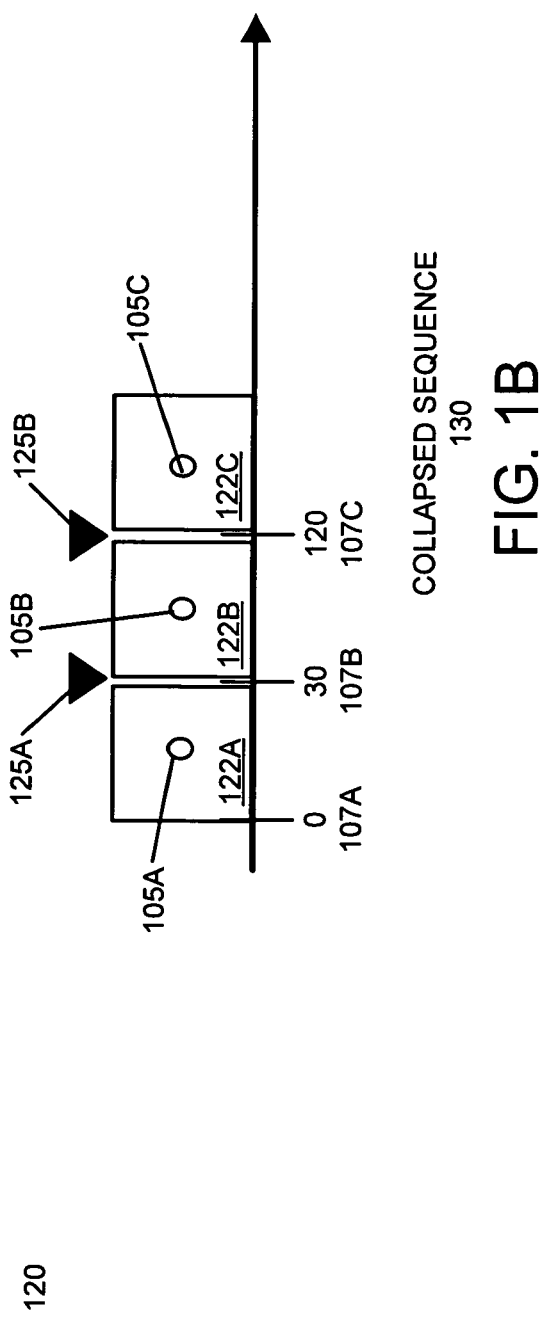

FIGS. 1A and 1B illustrate example display areas include sparse arrangements of data in fully expanded and folded presentations. FIG. 1A illustrates an example display area 100 presenting a sequential arrangement of data or items 105 according to an embodiment of the invention. Display area 100 may correspond with an application, operating system or web browser window; a full-screen display; or any other portion of a graphical user interface. Items 105 may represent any type of data in a computer system, including data values of variables, such as animation variable values; files and directories in a file system; classes and subclasses of an object-oriented data model; data objects and attributes; data or metadata within a database or file; structured lists and outlines of data; blocks of text; source code; network hierarchies; data flows and networks of computations and operations, such as animation variables, shading networks, and deformer networks; hierarchical calendars and project timelines. The items may be selected by a user, an application, or provided in response to a search query or filter criteria. For example, display area 100 presents items representing animation variable values used for creating computer graphics images and animations, although embodiments of the invention may be applied to any other type of data in a computer system.

Display area 100 presents items 105 arranged according to a sequence 110. In the example of display area 100, each of the items 105 is associated with a position in sequence 110. For example, item 105a is associated with position 0, 107a; item 105b is associated with position 30, 107b; and item 105c is associated with position 120, 107c. Sequence 110 is referred to as a sparse arrangement of data, because other positions in the sequence are not associated with items. For example, interval 115a, including sequence positions between position 0 107a and position 30 107b, and interval 115b, including sequence positions between position 30 107b and position 120 107c, do not include any items or data.

Display area 100 may display items 105 as text, icons, graphical indicators, still or moving images, previews or representations of item content, and/or any combination thereof.

To facilitate user understanding and manipulation of items in sequence 110, sequence 110 may be condensed or collapsed to form a collapsed presentation of the sequence, in which some or all of the empty space in the arrangement of data is hidden from users. FIG. 1B illustrates an example display area 120 presenting a sequential arrangement of data or items 105 according to an embodiment of the invention.

Example display area 120 includes a collapsed sequence 130 for presenting the sequential arrangement of data or items 105. In collapsed sequence 130, the empty portions of sequence 110, such as intervals 115a and 115b in FIG. 1A, have been hidden from the user.

In an embodiment, display area 120 represents the visible positions of collapsed sequence 130 as cells 122. In the example of FIG. 1B, the cells 122a, 122b, and 122c correspond with the positions 0 107a, 30 107b, and 120 107c in the collapsed sequence 130. Because each of these positions 107 in the sequence is associated with an item, cells 122a, 122b, and 122c include items 105a, 105b, and 105c, respectively.

In an embodiment, display area 120 may be static or interactive. For example, users may activate expansion buttons 125a and 125b to reveal the hidden portions of the collapsed sequence 130, such as interval 115a and 115b, respectively.

Additionally, display area 120 may include other interactive behavior, depending upon the types of items and the type of application. For example, selecting an item may open an editor or application for viewing or modifying the values or attributes of the selected item. In another example, items 105 may be moved, for example by dragging with a cursor, to change their location in the sequence. Items 105 may also serve as drop targets for moving or copying data from other locations. One or more items 105 may be selected for editing, modification, or to define data operations. In these examples, the items are referred to as including active user interface elements responsive to commands from users or applications.

Although the collapsed sequence 130 allows users to view the relative arrangement of items associated with an arrangement of data, it does not take into account the meaning of the empty positions or elements in the sequence. Further, it is difficult for users to add further data or items to an arrangement of data in its collapsed form. Typically, a user must expand or reveal all or at least a complete interval of the sequence to add data or an item at any position between previously existing items in a sequence.

To address this, an embodiment of the invention allows users to incrementally expand collapsed sequences to add data or items. As collapsed sequences or other sets of data or items are expanded, an interval distribution function is used to select all or a portion of the intervening items to add to the display. For example, when a collapsed sequence between two selected items is expanded, an interval distribution function may select previously-hidden items for display at regular increments of the interval between the two selected items or at fractions of the interval. In this example, the interval distribution function determines selects items to be revealed as the sequence is expanded based on the positions of items. In other embodiments, interval distribution functions may select items to be revealed as the sequence is expanded based on other attributes of the items, such as attribute values assigned to items by a user, hierarchy levels associated with items, and the association of items with selected or unselected components.

Figure 2C:
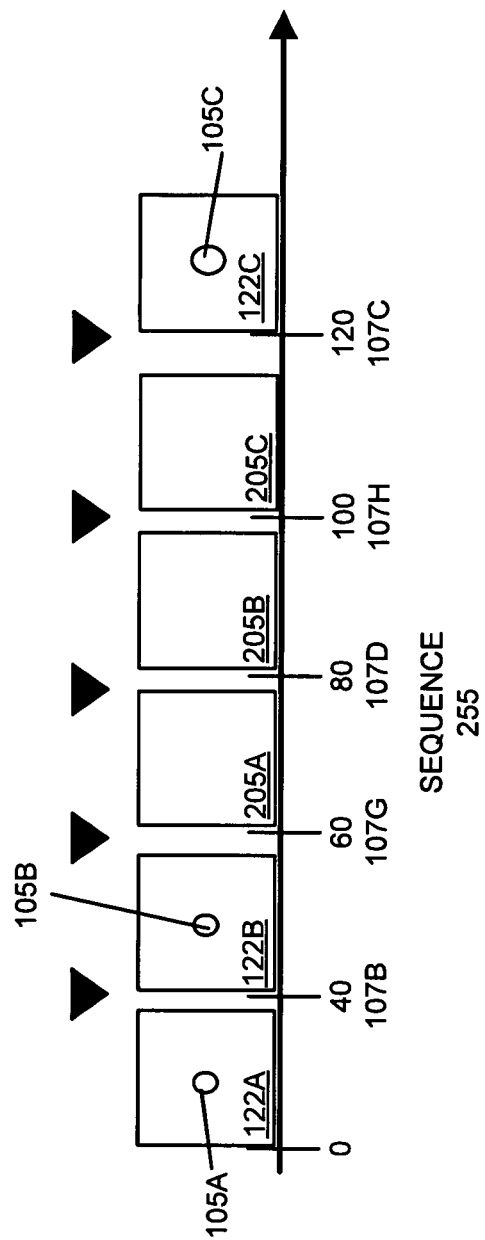

FIGS. 2A-2C illustrate example unfoldings of sparse arrangements of data according to embodiments of the invention. FIG. 2A illustrates an example display area 200 according to an embodiment of the invention. Example display area 200 continues the example of display area 120 in FIG. 1B. In example display area 200, a user or application has provided a command, control gesture, or other input to the collapsed sequence 130 to form partially-expanded sequence.

In this example, the command, control gesture, or other input is directed to partially expand the interval of the sequence between cell 122b, at position 40 107b, and cell 122c, at position 120 107c. In response to this input, an embodiment of the invention displays partially-expanded sequence 210 including an empty cell 205a between cells 122b and 122c. In an embodiment, the empty cell 205a displayed in response to the input is based on a fraction of the interval between cells 122b and 122c. In this example, cell 205a is halfway (i.e. ½) between cells 122b and 122c, at position 80 107d in sequence 210.

Following this input and the display of cell 205a in sequence 205, users or applications may add data to the empty cell 205a. Additionally, users or applications may provide an additional command or other input to collapse the sequence 210, hiding cell 205a, and returning the display area to a similar state as that shown in FIG. 1B.

In still further embodiments, optional expansion buttons 125 allow users to reveal additional hidden portions of the sequence 210. For example, activating expansion button 125c will reveal all the empty cells between cells 205a and 122b; and activating expansion button 125d will reveal all the empty cells between the cells 205a and 122c.

Alternatively, users or applications may elect to expand the interval between cells 122b and 122c further. For example, a user may enter a second command or other input to further expand the partially-expanded sequence 210. In response to the second command, the partially-expanded sequence 210 is changed into second partially-expanded sequence 220 shown in example display area 215 in FIG. 2B.

In an embodiment, the number of empty cells 205 in second partially-expanded sequence 220 is increased, for example by one, and the fractional intervals between empty cells 205 and cells 122b and 122c is decreased. In this example, the fractional interval is changed from ½ to ⅓, such that empty cells 205a and 205b in the second expanded sequence 220 are located at positions 67 107e and 93 107f in the second sequence 220.

As with sequence 205, users or applications may add data to the empty cells 205a and/or 205b. Additionally, users or applications may provide an additional command or other input to collapse the sequence 210, hiding cells 205a and/or 205b, and returning the display area to a similar state as that shown in FIG. 1B or FIG. 2A.

FIG. 2C illustrates an example display area 250 according to an embodiment of the invention. Example display area 250 continues the example of display area 215 in FIG. 2B. In example display area 250, a user or application has provided a third command, control gesture, or other input to the collapsed sequence 255 to form partially-expanded sequence 255.

In response to the third command or other input, the partially expanded sequence 255 includes a third empty cell 205c. In this example, the fractional interval is changed from ⅓ to ¼, such that empty cells 205a, 205b, and 205c in the expanded sequence 255 are located at position 60 107g, position 80 107d, and position 100 107h, respectively in the sequence 255.

Following this input and the display of empty cell 205c in sequence 255, users or applications may add data to any of the empty cells 205. Additionally, users or applications may provide an additional command or other input to collapse the sequence 255, hiding some or all of the empty cells 205, and returning the display area 250 to a similar state as that shown in FIG. 1B, FIG. 2A, or FIG. 2B.

In further embodiments, users or applications can partially expand any hidden portion of a sequence or other arrangement of data or items by any arbitrary fractional intervals, with empty cells being displayed in at least approximately equal intervals, up to and including the entire set of empty cells between two non-empty cells associated with data or items. Additionally, if a collapsed sequence includes two or more hidden sets of empty cells between non-empty cells, each set of empty cells may be partially expanded independently of the other sets of empty cells.

In a further embodiment, a user or application may provide a single command, gesture, or any other type of input to directly change the fully collapsed sequence 130 to partially-expanded sequence 220, 255, or any other partially-expanded sequence of arbitrary length directly, bypassing any intermediate partially-expanded sequences.

Figure 3A:
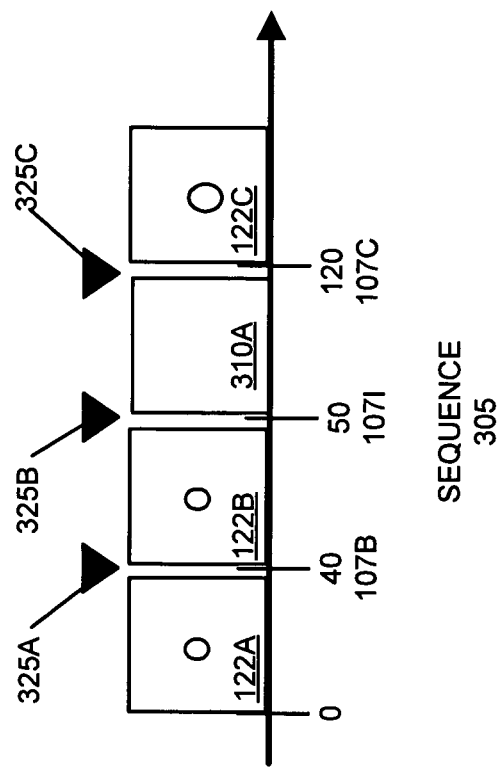
FIGS. 3A-3B illustrate example unfoldings of sparse arrangements of data according to embodiments of the invention.

In addition to expanding and revealing portions of hidden sets of empty cells in fractional intervals, an embodiment of the invention can also reveal hidden empty cells in fixed intervals. FIG. 3A illustrates an example display area 300 according to an embodiment of the invention. Example display area 300 continues the example of display area 120 in FIG. 1B. In example display area 300, a user or application has provided a command, control gesture, or other input to the collapsed sequence 130 to form partially-expanded sequence 305.

In this example, the command, control gesture, or other input is directed to partially expand the interval of the sequence between cell 122b, at position 40 107b, and cell 122c, at position 120 107c. In response to this input, an embodiment of the invention displays partially-expanded sequence 305 including an empty cell 310a between non-empty cells 122b and 122c. In an embodiment, the empty cell 310a displayed in response to the input is based on a fixed interval between cells 122b and 122c. In this example, cell 310a is ten positions away from cell 122b, at position 50 107i in sequence 305.

Following this input and the display of cell 310a in sequence 305, users or applications may add data to the empty cell 310a. Additionally, users or applications may provide an additional command or other input to collapse the sequence 305, hiding cell 310a, and returning the display area to a similar state as that shown in FIG. 1B.

In still further embodiments, optional expansion buttons 325 allow users to reveal additional hidden portions of the sequence 305. For example, activating expansion button 325c will reveal all the empty cells between cells 310a and 122c.

Figure 3B:
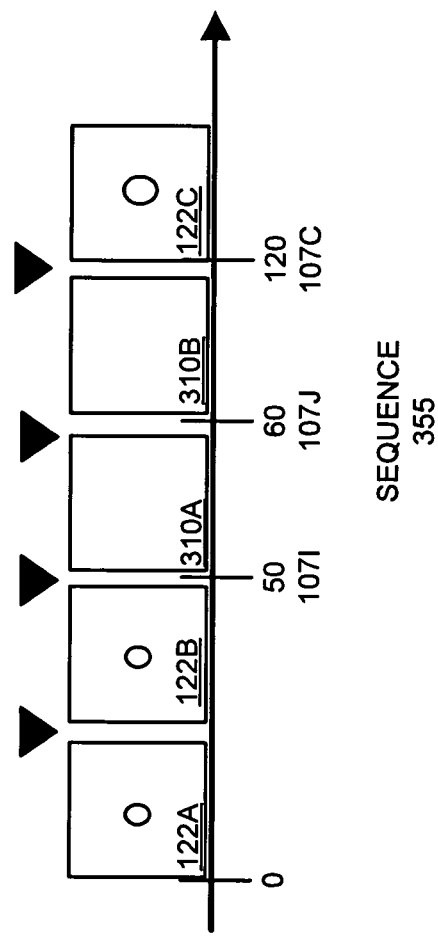

Alternatively, users or applications may elect to expand the interval between cells 122b and 122c further, revealing additional empty cells. For example, a user may enter a second command or other input to change the partially-expanded sequence 305 to a second partially-expanded sequence 355 shown in example display area 350 of FIG. 3B.

In an embodiment, the second partially-expanded sequence 355 includes empty cell 310a, which is at position 50 107i, and additional empty cell 310b, which is at position 60 107j.

In further embodiments, users or applications can partially expand any hidden portion of a sequence or other arrangement of data or items by any arbitrary number of empty cells, with empty cells being displayed at fixed intervals up to the next non-empty cell. In a further embodiment, upon expanding a set of empty cells up to the next non-empty cell, further expansions of the set of empty cells will reduce the size of the fixed interval between empty cells, allowing for the insertion of additional empty cells. This is similar to the behavior shown in FIGS. 2A-2C. Additionally, if a collapsed sequence includes two or more hidden sets of empty cells between non-empty cells, each set of empty cells may be partially expanded independently of the other sets of empty cells.

FIGS. 2A-2C and 3A-3B illustrate example sequential arrangements of data. However, these embodiments of the invention are also applicable to sparse hierarchical arrangements of data or items. FIGS. 4A-4B illustrate example unfoldings of sparse hierarchical arrangements of data according to embodiments of the invention.

FIG. 4A illustrates an example display area 400 includes a collapsed hierarchical arrangement 405 of items 410. In this example, the items 410 are layers used to define and organize computer graphics and animation data, including lighting layers 410a, layout layers 410b, animation layers 410c, articulation layers 410d, and modeling layers 410e. In the example hierarchical arrangement 405, layers 410 each represent a hierarchy including one or more layer data structures. In an embodiment, a collapsed hierarchical arrangement of layers or other types of items may represent the layers or other types of items that include data for one or more selected components. Other layers or items that are empty or contain data for unselected components may be hidden from view by the collapsed hierarchy.

In response to a command, control gesture, or other input, the collapsed hierarchical arrangement 405 is changed to partially-expanded hierarchical arrangement 455 in example display area 450 shown in FIG. 4B. Partially-expanded hierarchical arrangement 455 includes additional layers 460 in one or more layer hierarchies, which were hidden in the collapsed hierarchical arrangement 405. In this example, lighting layers 410a includes child spotlight layers 460a and fill light layers 460b; layout layers 410b includes child character layout layers 460c and set layout layers 460d; animation layers 410c includes character A animation child layers 460e, character B animation child layers 460f, character C animation child layers 460g; articulation layers 460a and fill light layers 460b; articulation layers 410d includes character articulation child layers 460h; and modeling layers 410e includes character modeling child layers 460i and set modeling layers 460j.

In this example, the command, control gesture, or other input expands all of the visible items 410 to reveal one additional level of hierarchical items 460. In further embodiments, the command, control gesture, or other input may reveal any arbitrary number of levels of hierarchical items. Additionally, users or applications may provide an additional command or other input to collapse the one or more levels of the hierarchy for all or a portion of the items or data.

In a further embodiment, a command, control gesture, or other input may expand or contract only a portion of the visible items 410 by one or more hierarchical levels, such as a portion selected by a user or designated by the input.

In an embodiment, the expansion of a collapsed hierarchical arrangement is performed in a breadth-first manner. In response to a command, control gesture, or other input, an embodiment of the invention reveals an additional item associated with a selected item via a hierarchical association, such as a descendant association. In this embodiment, a first command, control gesture, or other input will reveal a first additional item at a first descendant hierarchical level relative to the selected item. Further commands, control gestures, or other inputs will reveal further additional items at the first descendant hierarchical level, until there are no more hidden items at this first descendant level left to reveal. At this point, a subsequent command, control gesture, or other input will reveal an additional item at a second descendant level relative to the selected item. In this embodiment, the interval distribution function selects items for display based on an associated hierarchy level.

The above examples describe embodiments of the invention applied to sequential and hierarchical arrangements of data or other items. Yet further embodiments of the invention may be similarly applied to any arbitrary graph of data or items. In these embodiments, nodes that are empty, associated with a specified hierarchy level, and/or satisfy any other criteria may be automatically hidden and grouped with visible data or items. In response to commands, gestures, or other inputs, hidden data may be revealed based on hierarchy level or a relative position with respect to one, two, or more visible items, such as based on fractional or fixed intervals of position in the arrangement of data.

Figure 5:
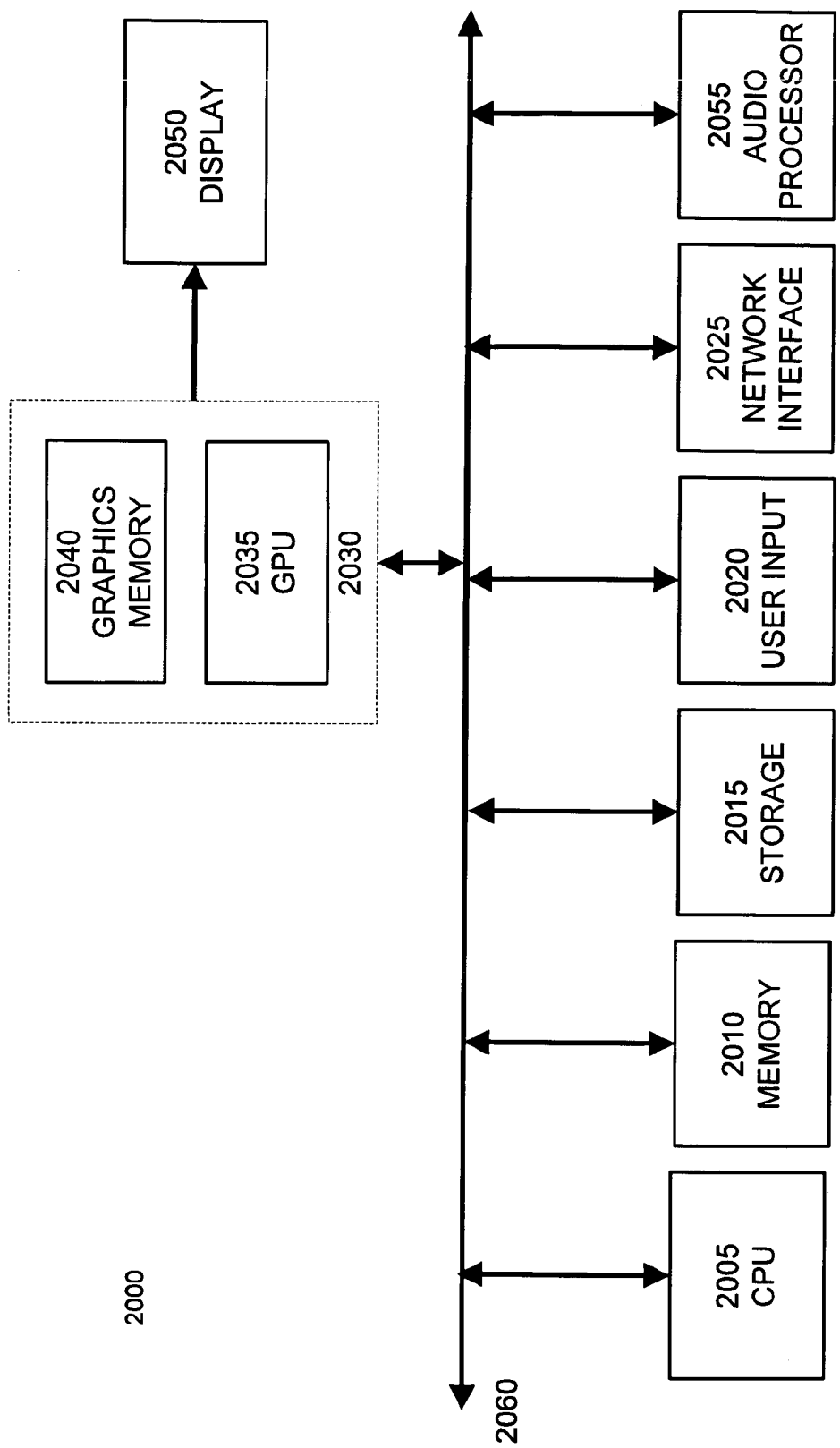
FIG. 5 illustrates an example computer system suitable for implementing embodiments of the invention.

FIG. 5 illustrates an example computer system 2000 suitable for implementing embodiments of the invention. FIG. 5 is a block diagram of a computer system 2000, such as a personal computer, video game console, personal digital assistant, other digital device, or other information processing device suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer lets, touch pads, single or multi-touch touch screens, still or video cameras, motion sensors, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to a renderfarm or a set of server computers, each similar to computer system 2000, via the network interface 2025 or storage 2015. The renderfarm generates one or more rendered images of the scene using the provided instructions and/or data. These rendered images may be stored on computer-readable media in a digital format and optionally returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can further include one or more programmable execution units capable of executing shader programs. GPU 2035 can be comprised of one or more graphics processing unit cores.

The CPU 2005, renderfarm, and/or GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays, as well as film recorders adapted to reproduce computer generated images on photographic film. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005. In still further embodiments, all or a portion of the graphics subsystem 2030 may be omitted and software executed by CPU 2005 may perform the functions of the graphics subsystem 2030.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of displaying items in a sparse data set, the method comprising:
   receiving a sparse data set including first and second positions associated with first and second items, respectively, and empty positions between the first and second positions that are not associated with the first or second items;
   displaying a condensed arrangement of the first and second items in a first sequence including the first and second positions;

receiving a first command; and in response to the first command:

selecting a first subset of the empty positions based on an interval distribution function; and displaying an expanded arrangement of the first and second items in a second sequence including the first and second positions and visible empty positions corresponding with the first subset of the empty positions between the first and second positions.

2. The method of claim 1, wherein the expanded arrangement does not include visible empty positions corresponding with an unselected first subset of the empty positions between the first and second positions.

3. The method of claim 1, wherein the interval distribution function selects the first subset of the empty positions for display based on a first fraction of an interval between the first and second positions.

4. The method of claim 1, wherein the interval distribution function selects the first subset of the empty positions based on a regular division of an interval between the first and second positions.

5. The method of claim 1, wherein:

the condensed arrangement includes at least one visible empty position between the first and second positions; and the interval distribution function selects the first subset of empty positions for display in the expanded arrangement based on the visible empty position and the first and second positions included in the condensed arrangement.

6. The method of claim 1, wherein the interval distribution function selects the first subset of empty positions based on an attribute of at least a first one of the empty positions.

7. The method of claim 6, wherein the attribute is a user-defined attribute.

8. The method of claim 6, wherein the attribute is a hierarchy level associated with the first one of the empty positions.

9. The method of claim 6, wherein:

the first and second items are associated with at least one selected component; and the attribute is an additional item associated with an unselected component.

10. The method of claim 1, comprising:

receiving a second command; and in response to the second command:

selecting a second subset of the empty positions based on the interval distribution function; and displaying a second expanded arrangement of the first and second items in a third sequence including the first and second positions and additional visible empty positions corresponding with at least the second subset of the empty positions between the first and second positions.

11. The method of claim 10, wherein at least a portion of the second subset of empty items is located in the third sequence adjacent to the first position.

12. The method of claim 10, wherein the second visible empty positions includes the first subset of empty positions.

13. The method of claim 12, wherein at least a portion of the second subset of empty items is located between at least two of the first subset of empty items.

14. The method of claim 10, wherein at least a portion of the second subset of empty items is located in the third sequence adjacent to the second position.

15. The method of claim 10, wherein the second subset of empty positions is larger than the first subset of empty positions.

16. The method of claim 10, comprising:

in response to the second command, removing the first subset of empty positions from the visible empty positions.

17. The method of claim 1, wherein the visible empty positions corresponding with the first subset of the empty positions are adapted to receive associations with additional items.

18. The method of claim 1, wherein the first command is received from a user via an input device.

19. The method of claim 1, wherein the first command is received from an application.

20. The method of claim 1, wherein the sparse data set includes sequentially arranged items.

21. The method of claim 1, wherein the data arrangement includes hierarchically arranged items.

22. The method of claim 1, wherein the items are selected from a group consisting of:

data in a computer system; data values of variables; files and directories in a file system; classes and subclasses of an object-oriented data model; data objects and attributes; data or metadata within a database or file; structured lists and outlines of data; blocks of text; source code; network hierarchies; computer graphics components; data flows and networks of computations and operations, such as animation variables, shading networks, and deformer networks; hierarchical data; and calendars and timelines.

* * * * *